United States Patent
Furuta (10) Patent No.: US 12,328,155 B2
(45) Date of Patent: Jun. 10, 2025

(54) COMMUNICATION DEVICE AND COMMUNICATION METHOD

(71) Applicants: Kabushiki Kaisha Toshiba, Tokyo (JP); Toshiba Electronic Devices & Storage Corporation, Tokyo (JP)

(72) Inventor: Hirotada Furuta, Meguro Tokyo (JP)

(73) Assignees: Kabushiki Kaisha Toshiba, Tokyo (JP); Toshiba Electronic Devices & Storage Corporation, Tokyo (JP)

(*) Notice: Subject to any disclaimer, the term of this patent is extended or adjusted under 35 U.S.C. 154(b) by 46 days.

(21) Appl. No.: 18/117,734

(22) Filed: Mar. 6, 2023

(65) Prior Publication Data

US 2024/0088939 A1    Mar. 14, 2024

(30) Foreign Application Priority Data

Sep. 12, 2022   (JP) .................................. 2022-144625
Feb. 28, 2023   (JP) .................................. 2023-029178

(51) Int. Cl.
     *H04B 3/46*          (2015.01)

(52) U.S. Cl.
     CPC ...................................... *H04B 3/46* (2013.01)

(58) Field of Classification Search
     CPC ...... H04B 17/17; H04B 3/46; G01R 31/3177; H03K 5/19
     See application file for complete search history.

(56) References Cited

U.S. PATENT DOCUMENTS

| | | | |
|---|---|---|---|
| 11,018,657 B1* | 5/2021 | Sinha | H03K 5/133 |
| 2011/0015882 A1* | 1/2011 | Guilhemsang | G01R 31/11 |
| | | | 702/59 |
| 2012/0303324 A1 | 11/2012 | Nakatani et al. | |
| 2017/0277585 A1* | 9/2017 | Nakajima | G06F 11/0757 |
| 2018/0329371 A1* | 11/2018 | Lin | G05B 9/02 |
| 2019/0366872 A1 | 12/2019 | Kanamori et al. | |
| 2020/0081062 A1* | 3/2020 | Goh | G01R 31/31816 |
| 2022/0345231 A1* | 10/2022 | Yilmazer | H04B 17/21 |

FOREIGN PATENT DOCUMENTS

| | | |
|---|---|---|
| JP | 2640909 B2 | 8/1997 |
| JP | 2012-242338 A | 12/2012 |
| JP | 6856506 B2 | 4/2021 |

* cited by examiner

*Primary Examiner* — Aristocratis Fotakis
(74) *Attorney, Agent, or Firm* — Kim & Stewart LLP (57) ABSTRACT

According to the present embodiment, a communication device comprises a transmitter and a receiver. The transmitter includes at least a predetermined one of signal values in a binary and is configured to be able to transmit a transmission signal following a first rule via a signal line. The receiver is configured to output a first signal when the transmission signal following the first rule is included in a signal having been received by the receiver via the signal line and to output a second signal indicating that the signal line is valid when the receiver has received a signal having a same value as the signal value.

19 Claims, 7 Drawing Sheets

COMMUNICATION DEVICE AND COMMUNICATION METHOD

CROSS-REFERENCE TO RELATED APPLICATIONS

This application is based upon and claims the benefit of priority from the prior Japanese Patent Application No. 2022-144625, filed on Sep. 12, 2022, and the prior Japanese Patent Application No. 2023-029178, filed on Feb. 28, 2023, the entire contents of which are incorporated herein by references.

FIELD

Embodiments of the present invention relate to a communication device and a communication method.

BACKGROUND

Along with downsizing of devices, the frequency of occurrence of signal line faults is increasing and its influence is becoming greater. Therefore, there has been a demand for diagnosing faults (open circuit, short circuit, bridging fault, crosstalk, and the like) on a signal line connecting devices or circuits.

DETAILED DESCRIPTION

Embodiments of the present invention have been made in view of the above circumstances, and have an object to provide a communication device that can perform fault diagnosis on a signal line without stopping a transmission signal from a signal line and a communication method.

A communication device according to the present embodiment comprises a transmitter and a receiver. The transmitter includes at least a predetermined one of signal values in a binary and is configured to be able to transmit a transmission signal following a first rule via a signal line. The receiver is configured to output a first signal when the transmission signal following the first rule is included in a signal having been received by the receiver via the signal line and to output a second signal indicating that the signal line is valid when the receiver has received a signal having a same value as the signal value.

Embodiments of the present invention are described below with reference to the accompanying drawings. In the following embodiments, while characteristic configurations and operations of the communication device and the communication method are described, configurations and operations for which descriptions are omitted may be also included in the communication device and the communication method.

First Embodiment

Figure 1:
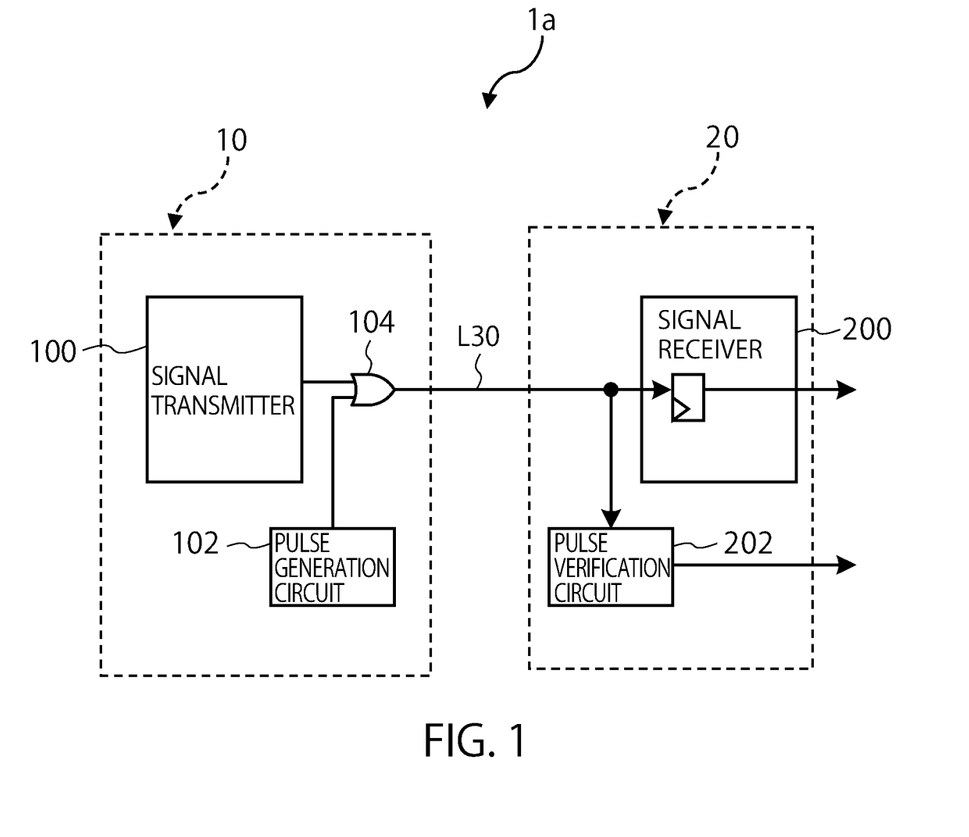
FIG. 1 is a block diagram illustrating a configuration example of a communication device according to a first embodiment.

FIG. 1 is a block diagram illustrating a configuration example of a communication device according to a first embodiment. As illustrated in FIG. 1, a communication device 1a can perform fault diagnosis on a signal line L30 and includes a transmitter 10 and a receiver 20. Faults of the signal line L30 include open-circuit, short-circuit, bridging fault, crosstalk, and the like. Details of the communication device 1a are described later.

The transmitter 10 is constituted in one of devices or circuits. The receiver 20 is constituted in the other one of the devices or circuits. The one device or the one circuit and the other device or the other circuit can perform processing for which both devices or both circuits cooperate with each other. Therefore, during execution of the cooperative processing, when there occurs an abnormal situation such as a fault or stoppage in either of the devices or circuits, there is a risk that if functions related to the other device or the other circuit are not suspended, the other device or the other circuit becomes unable to perform normal processing. Accordingly, when there occurs an abnormal situation such as a fault or stoppage in one of the devices or circuits, a transmission signal indicating the abnormality is transmitted to the other device or the other circuit via the signal line L30. With this configuration, for example, the other device or the other circuit can stop the cooperative processing.

Such a transmission signal indicating the abnormality is normally a high-level signal when a normal state of a signal line is at a low level. Alternatively, when the normal state of the signal line is at a high level, the transmission signal is a low-level signal. That is, a transmission signal has at least one of values of high-level and low-level binary signals.

However, in a transmission path of a signal line, when a state of a high-level signal as a normal state continues or a state of a low-level signal as a normal state continues, it is difficult to determine whether the state is due to a fault in the transmission path or it is a state where any transmission signal is not transmitted. Therefore, in fault diagnosis on a transmission path, a diagnostic signal having at least the same value as that of a transmission signal in binary signals is transmitted to the signal line. That is, similarly to the transmission signal, the diagnostic signal is a high-level signal when a normal state of the signal line is at a low level and is a low-level signal when the normal state of the signal line is at a high level.

Figure 2:
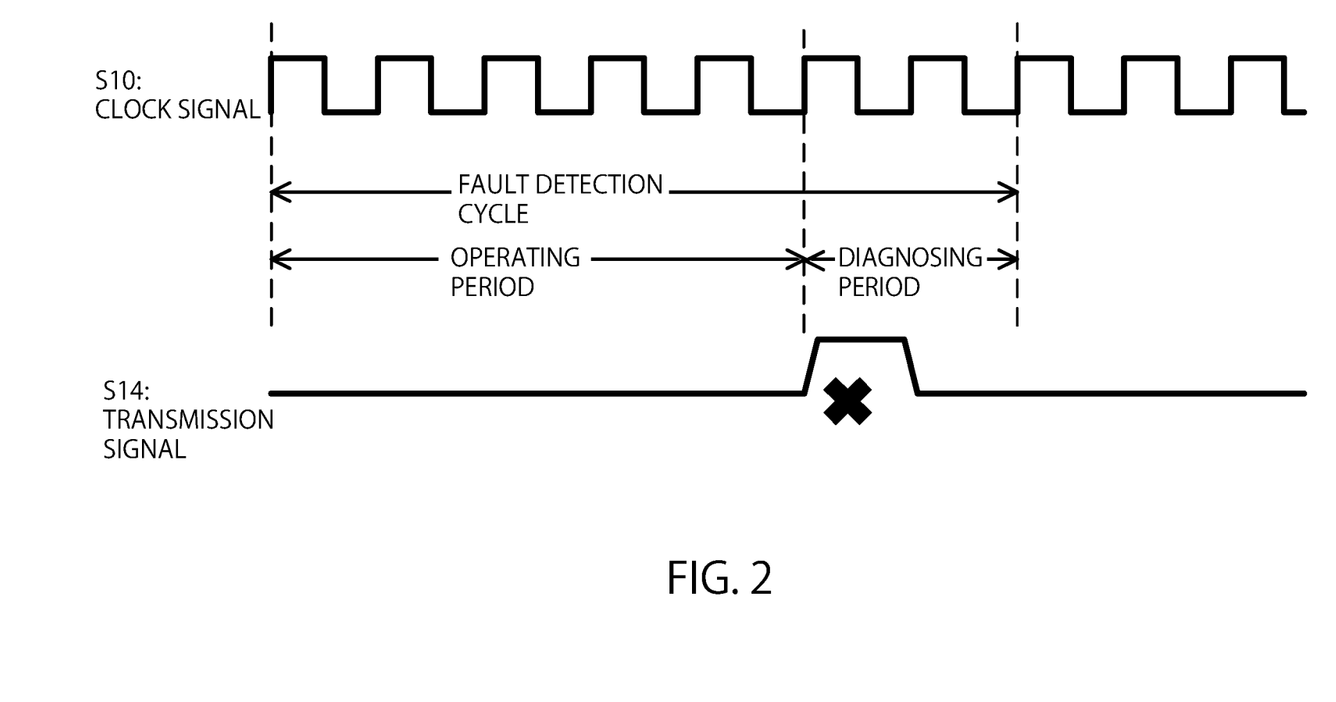
FIG. 2 is a time chart illustrating a fault diagnosis example on a transmission path.

FIG. 2 is a time chart illustrating a fault diagnosis example according to a comparative example on a transmission path. A clock signal S10 and a transmission signal S14 are illustrated in FIG. 2. The horizontal axis represents a time. Each signal is, for example, formed of binary signals of a high-level signal and a low-level signal. The transmitter 10 and the receiver 20 both receive a mutual clock signal S10.

As illustrated in FIG. 2, in the fault diagnosis example according to the comparative example, a diagnostic signal having at least one of values of binary signals is transmitted in an operating period. For example, when a normal state of a signal line is at a low level, the diagnostic signal is a high-level signal. Subsequently, in a diagnosing period, when a high-level signal is received in the operating period, the signal line is diagnosed to have no fault, and when any high-level signal is not received, the signal line is diagnosed to have a fault. In the present embodiment, while descriptions are made on an assumption that the normal state of the signal line L30 is at a low level, the present embodiment is not limited thereto. For example, if a high-level signal and a low-level signal are inversed to one another, equivalent processing can be performed. That is, the communication device 1a according to the present embodiment can generate a signal with a negative logic instead of a positive logic.

In the fault diagnosis example according to the comparative example, such a time period of a fault detection cycle is set in advance between two devices or two circuits. However, since it is not possible to distinguish as to whether it is a diagnostic signal or a transmission signal, in order to perform the diagnosis described above, in the time period of the fault detection cycle, it is necessary to provide a certain time period to suspend the functions of a transmission path in order to diagnose as to whether there is a signal line fault. Therefore, if an abnormality actually occurs in the time period of the fault detection cycle, transmission of a transmission signal is stopped once. Accordingly, in the fault diagnosis example according to the comparative example, when an abnormality occurs in the time period of the fault detection cycle, transmission of a transmission signal is delayed.

Figure 3:
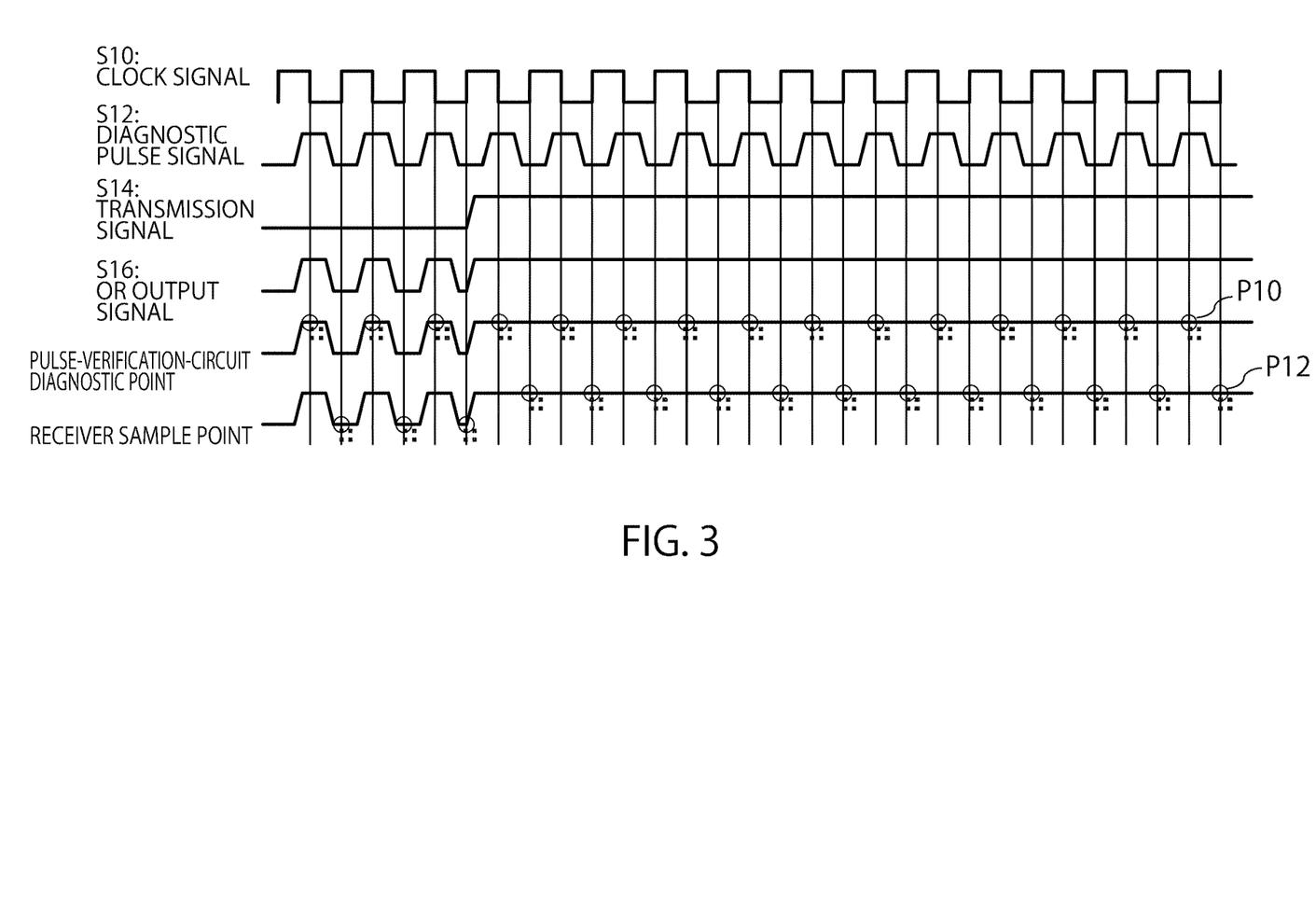
FIG. 3 is a time chart illustrating each signal generated by the communication device according to the present embodiment.

In order to solve such a problem, the communication device 1a according to the present embodiment includes the configuration illustrated in FIG. 1 and generates each signal illustrated in FIG. 3. That is, the transmitter 10 of the communication device 1a includes a signal transmitter 100, a pulse generation circuit 102, and an OR circuit 104. The receiver 20 includes a signal receiver 200 and a pulse verification circuit 202.

FIG. 3 is a time chart illustrating each signal generated by the communication device 1a according to the present embodiment. The clock signal S10, a diagnostic pulse signal S12, the transmission signal S14, an OR output signal S16, a pulse-verification-circuit diagnostic point P10, and a receiver sample point P12 are illustrated in FIG. 3. The horizontal axis represents a time. Each signal is, for example, formed of binary signals of a high-level signal and a low-level signal. The transmitter 10 and the receiver 20 receive a mutual clock signal S10.

As illustrated in FIGS. 1 and 3, the signal transmitter 100 generates a binary transmission signal S14 following a first rule. That is, according to the present embodiment, the first rule related to the transmission signal S14 represents a fact that a signal having a predetermined one of values of the binary is included at a predetermined time point.

For example, the signal transmitter 100 generates a signal having a high-level signal at a rise of the clock signal S10 as the transmission signal S14 following the first rule. In this manner, the first rule according to the present embodiment represents a fact that the transmission signal S14 is generated in such a manner that a signal having a predetermined one of values of the binary at a predetermined time point is included in the transmission signal S14.

Meanwhile, the pulse generation circuit 102 periodically generates a diagnostic pulse signal S12 not following the first rule. That is, the pulse generation circuit 102 generates binary signals not having any high-level signal at a rise of the clock signal S10. More specifically, the pulse generation circuit 102 includes a low-level signal at a rise of the clock signal S10 and generates a diagnostic pulse signal S12 having a high-level signal at a fall of the clock signal S10. The period of the diagnostic pulse signal S12 can be equal to, for example, the period of the clock signal S10. In this manner, the pulse generation circuit 102 periodically generates a diagnostic pulse signal S12 not following the first rule and having a predetermined one of signal values of a high-level signal and a low-level signal.

As the first rule, the signal transmitter 100 generates a transmission signal S14 having a high-level signal at a rise of the clock signal S10; however, the first rule is not limited thereto. For example, if the signal transmission unit 100 generates signals with a negative logic instead of a positive logic, as the first rule, the signal transmitter 100 may generate a transmission signal S14 having a high-level signal at a fall of the clock signal S10. In this case, the pulse generation circuit 102 generates a low-level signal at a fall of the clock signal S10 and generates a diagnostic pulse signal S12 having a high-level signal at a rise thereof. The diagnostic pulse signal S12 according to the present embodiment corresponds to a diagnostic signal.

The OR circuit 104 outputs an OR signal formed of the binary transmission signal S14 generated by the signal transmitter 100 and the binary diagnostic pulse signal S12 generated by the pulse generation circuit 102 as the OR output signal S16 to the signal line L30.

When the signal value at the receiver sample point P12 is at a high level, the signal receiver 200 outputs a high-level signal indicating a fact that the transmission signal S14 has been transmitted. The receiver sample point P12 is a rise timing of the clock signal S10. Meanwhile, the signal receiver 200 outputs a low-level signal when the transmission signal S14 has not been transmitted. The high-level signal of the signal receiver 200 according to the present embodiment corresponds to a first signal.

The signal receiver 200 includes, for example, a D flip-flop. The clock signal S10 is input in the D flip-flop and the OR output signal S16 is read by a D terminal at a rise of the clock signal S10. That is, since the receiver sample point P12 is a rise of the clock signal S10, when the transmission signal S14 following the first rule is included in the OR output signal S16, a high-level signal is taken in and the high-level signal is output from a Q terminal.

Meanwhile, when the transmission signal S14 following the first rule is not included in the OR output signal S16, a low-level signal is taken in at a rise of the clock signal S10 and a low-level signal is output from the Q terminal. That is, the signal receiver 200 outputs a signal indicating a high level when the transmission signal S14 following the first rule is included in the OR output signal S16 and indicating a low level when it is no included in the OR output signal S16. With this configuration, devices or circuits on the receiver 20 side can execute control such as stoppage of processing when the output signal from the signal receiver 200 is at a high level.

When the signal value at the pulse-verification-circuit diagnostic point P10 is at a high level, the pulse verification circuit 202 outputs a high-level signal indicating that the signal line L30 is valid. That is, the pulse verification circuit 202 outputs a high-level signal indicating that the signal line L30 is valid when a signal having the same value as that of the transmission signal S14 is received in a predetermined time period. For example, the predetermined time period is one clock period. In this manner, when a high-level signal is included in the OR output signal S16 during one clock period, the pulse verification circuit 202 outputs a high-level signal.

Meanwhile, when the signal value at the pulse-verification-circuit diagnostic point P10 is not at a high level, the pulse verification circuit 202 outputs a low-level signal. That is, when any signal having the same value as that of the transmission signal S14 is not included in the predetermined time period, the pulse verification circuit 202 outputs a low-level signal. As described above, the predetermined time period is one clock period. In this manner, when any high-level signal is not included in one clock period, the pulse verification circuit 202 outputs a low-level signal. With this configuration, if the signal line L30 is disconnected and a high-level signal cannot be received, the pulse verification circuit 202 outputs a low-level signal. The high-level signal of the pulse verification circuit 202 according to the present embodiment corresponds to a second signal.

For example, the pulse verification circuit 202 includes a D flip-flop to which the clock signal S10 is inputted as it is inversed. The clock signal S10 is inputted in the D flip-flop in an inverted manner and the OR output signal S16 is read by the D terminal at the pulse-verification-circuit diagnostic point P10 that is a fall of the clock signal S10. That is, since the pulse-verification-circuit diagnostic point P10 is a fall of the clock signal S10, when a high-level signal is included at a fall of the clock signal S10 in the OR output signal S16, a high-level signal is taken in and, for example, the high-level signal is output from the Q terminal. In the present embodiment, at a fall of the clock signal S10, the OR output signal S16 is constantly a high-level signal, so that the pulse verification circuit 202 constantly outputs a high-level signal as long as there is no fault in the signal line L30.

Further, when a low-level signal is included in the OR output signal S16 at a fall of the clock signal S10, the pulse verification circuit 202 takes in the low-level signal and outputs the low-level signal from the Q terminal. That is, when any high-level signal is not included in the OR output signal S16 at a fall of the clock signal S10, the pulse verification circuit 202 outputs a low-level signal. With this configuration, in a case where the signal line L30 is disconnected and the like, the pulse verification circuit 202 constantly outputs a low-level signal. In this manner, the pulse verification circuit 202 outputs a high-level signal when the diagnostic pulse signal S12 as a high-level signal is included at a fall of the clock signal S10 or when the transmission signal S14 is included at a fall of the clock signal S10, and outputs a low-level signal when neither of these signals are included.

As is clear from the above descriptions, when the transmission signal S14 following the first rule is included in the OR output signal S16, the signal receiver 200 outputs a high-level signal as the first signal. In this case, since the diagnostic pulse signal S12 as a diagnostic signal does not follow the first rule, the signal receiver 200 outputs a low-level signal even when the signal receiver 200 receives only the diagnostic pulse signal S12. Meanwhile, even when the time periods of a high-level signal of the diagnostic pulse signal S12 and that of the transmission signal S14 following the first rule are overlapped on each other, since the transmission signal S14 following the first rule is included in the OR output signal S16, the signal receiver 200 outputs a high-level signal as the first signal.

As described above, even when the diagnostic pulse signal S12 as a diagnostic signal is periodically transmitted to the signal line L30, the signal receiver 200 can determine transmission of the transmission signal S14. Accordingly, even when a fault detection cycle is constantly repeated, the transmission signal S14 can be transmitted without delay.

Meanwhile, when a high-level signal is included at a fall of the clock signal S10 in the OR output signal S16, the pulse verification circuit 202 outputs a high-level signal as the second signal. Accordingly, as long as there is no disconnection and the like in the signal line L30, the pulse verification circuit 202 constantly outputs a high-level signal as the second signal, so that devices or circuits on the receiver 20 side can determine that the signal line L30 is operating normally.

Further, when any high-level signal is not included at a fall of the clock signal S10 in the OR output signal S16, the pulse verification circuit 202 outputs a low-level signal. That is, in a case where the signal line L30 is disconnected and the like, the pulse verification circuit 202 constantly outputs a low-level signal. Accordingly, when the second signal is at a low level, devices or circuits on the receiver 20 side can execute control such as stoppage of processing.

As described above, in the present embodiment, the transmitter 10 makes the OR output signal S16 having the transmission signal S14 following the first rule transmissible via the signal line L30, and the receiver 20 is configured to output a high-level signal (the first signal) when the transmission signal S14 following the first rule is included in the OR output signal S16 received via the signal line L30. Accordingly, even when only the diagnostic pulse signal S12 not following the first rule is received, the receiver 20 can be configured not to output a high-level signal (the first signal). Further, even when the time periods of a high-level signal of the diagnostic pulse signal S12 and that of the transmission signal S14 following the first rule are overlapped on each other, if the transmission signal S14 following the first rule is included in the OR output signal S16, the signal receiver 200 can output a high-level signal (the first signal).

In this manner, even when the diagnostic pulse signal S12 as a diagnostic signal is periodically transmitted to the signal line L30, the signal receiver 200 can determine transmission of the transmission signal S14. Accordingly, even when a fault detection cycle is constantly repeated, the transmission signal S14 can be transmitted without delay.

Further, upon reception of a high-level signal, the receiver 20 outputs a high-level signal (the second signal) indicating that the transmission signal S14 is valid, so that even when the transmission signal S14 and the diagnostic pulse signal S12 are signals having the same high-level values, the validity of the signal line L30 can be verified.

Furthermore, the transmitter 10 is configured to periodically transmit the diagnostic pulse signal S12 not following the first rule and having a high-level signal to the signal line L30. With this configuration, by periodically taking in the diagnostic pulse signal S12, the receiver 20 can periodically perform fault diagnosis on the signal line L30 without interfering the transmission signal S14.

Second Embodiment

Figure 4:
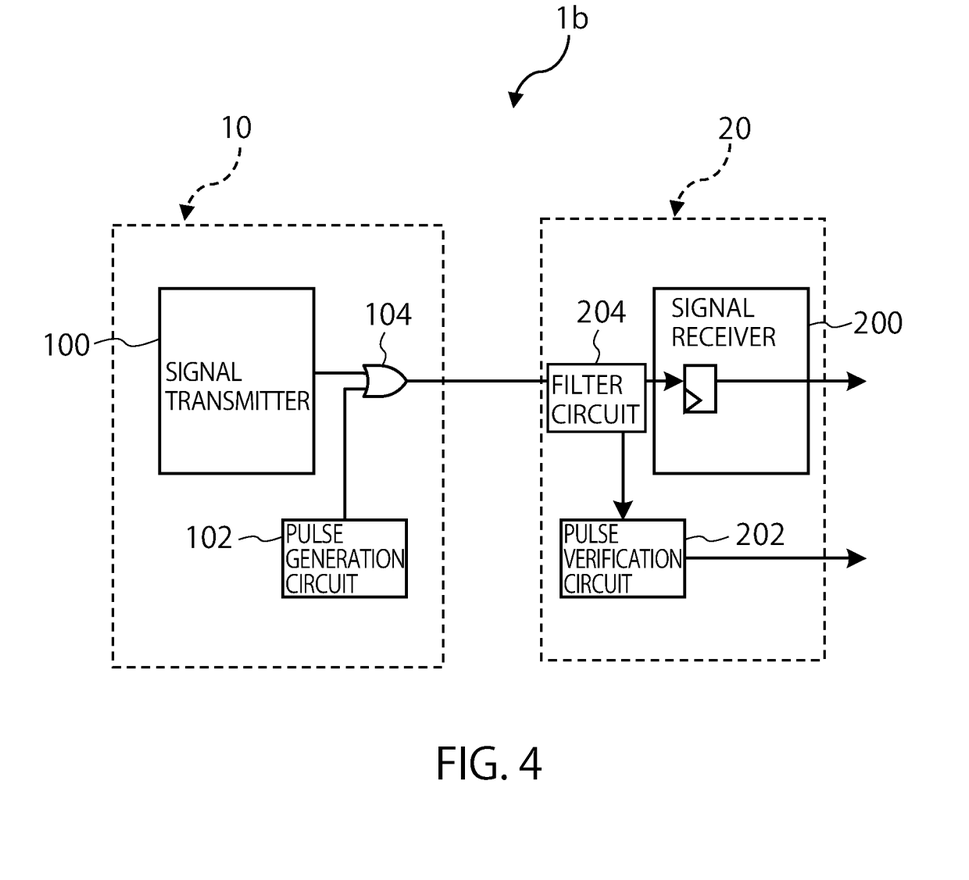
FIG. 4 is a block diagram illustrating a configuration example of a communication device according to a second embodiment.

A communication device 1b according to a second embodiment is different from the communication device 1a according to the first embodiment in a feature that the communication device 1b can perform a diagnostic operation on only one of points at a rise or a fall of the clock signal S10. In the following descriptions, differences from the communication device 1a according to the first embodiment are explained.

FIG. 4 is a block diagram illustrating a configuration example of the communication device 1b according to the second embodiment. The receiver 20 according to the second embodiment is different from the receiver 20 included in the communication device 1a according to the first embodiment in a feature of further including a filter circuit 204.

Figure 5:
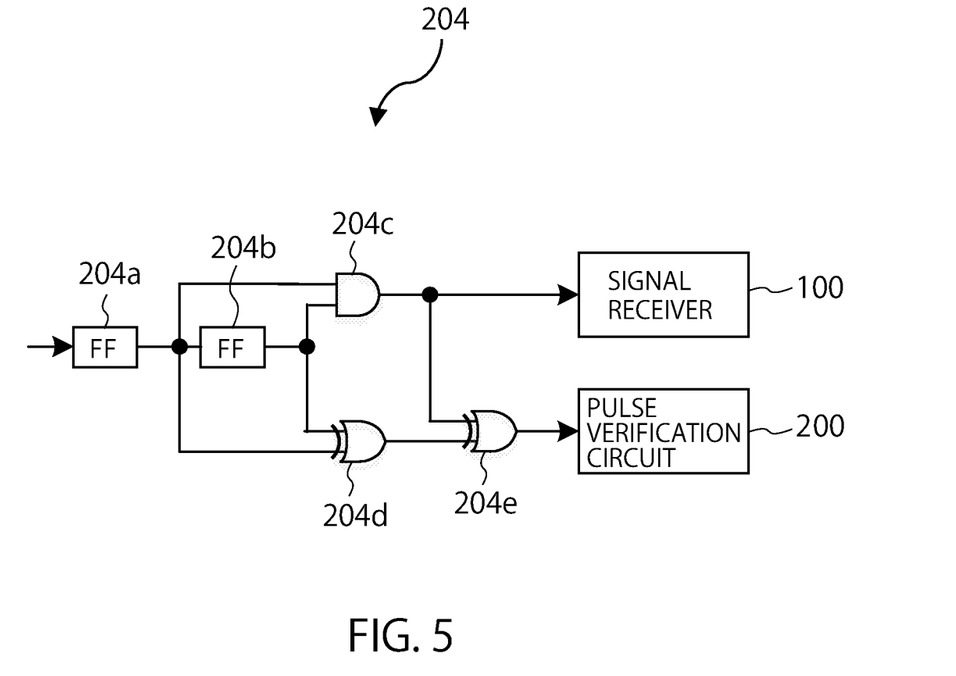
FIG. 5 is a block diagram illustrating a configuration example of a filter circuit.

FIG. 5 is a block diagram illustrating a configuration example of the filter circuit 204. The filter circuit 204 includes a first circuit 204a, a second circuit 204b, an OR circuit 204c, a first exclusive OR circuit 204d, and a second exclusive OR circuit 204e.

The first circuit 204a is, for example, a D flip-flop. The first circuit 204a delays the OR output signal S16 having been received via the signal line L30 for one clock period. The D flip-flop reads the OR output signal S16 at a rise of the clock signal S10 with the D terminal and outputs the OR output signal S16 at the next rise of the clock signal S10 from the Q terminal.

The second circuit 204b is, for example, a D flip-flop. The second circuit 204b delays an output signal from the first circuit 204a for one clock period. The D flip-flop reads an output signal from the first circuit 204a at a rise of the clock signal S10 with the D terminal and outputs the output signal from the Q terminal at the next rise of the clock signal S10.

The OR circuit 204c outputs a result signal of a logical OR of output signals from the first circuit 204a and the second circuit 204b to the signal receiver 200. The first exclusive OR circuit 204d outputs a result signal of an exclusive logical OR (exOR) of output signals from the first circuit 204a and the second circuit 204b. The second exclusive OR circuit 204e outputs a result signal of an exclusive logical OR of output signals from the first exclusive OR circuit 204d and the second circuit 204b to the pulse verification circuit 202.

Figure 6:
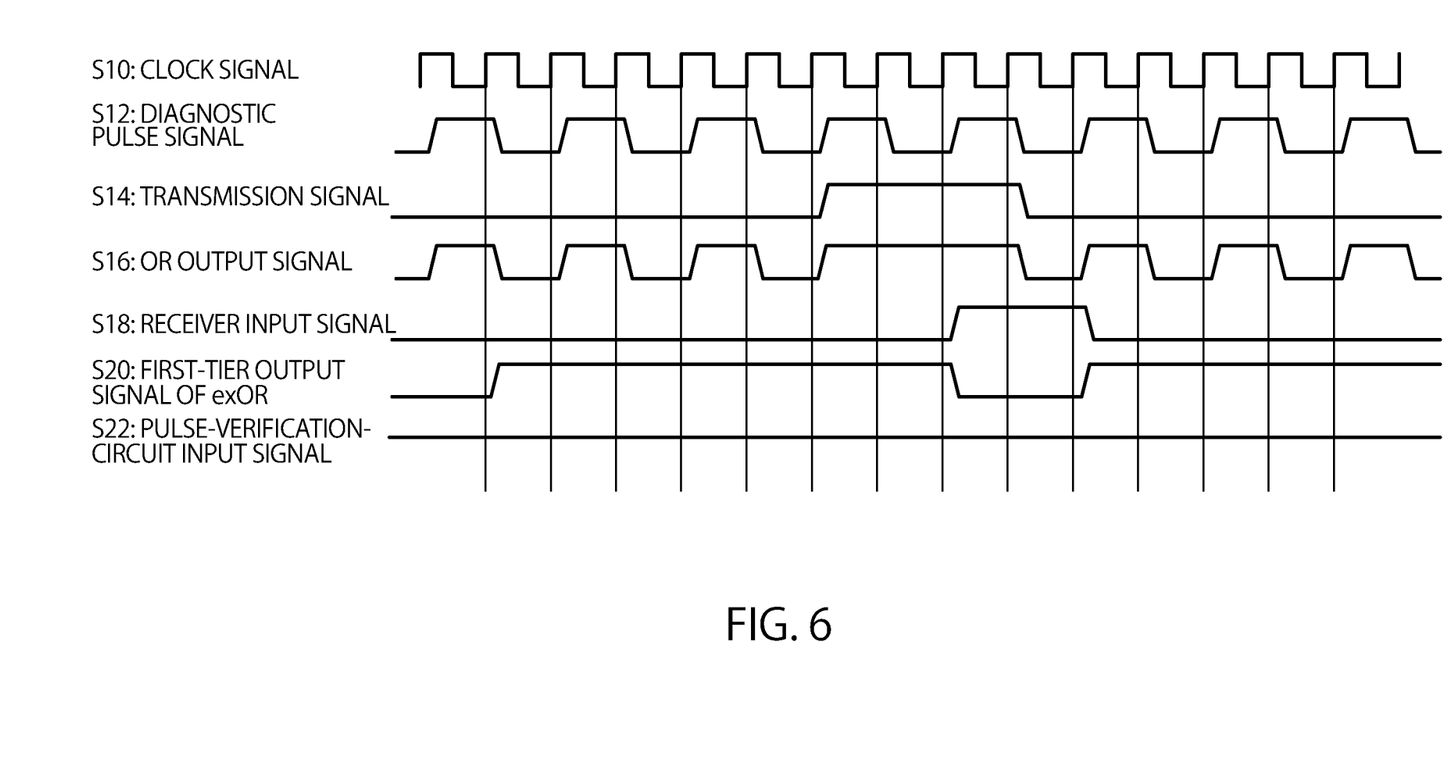
FIG. 6 is a time chart illustrating each signal generated by the communication device according to the second embodiment.

FIG. 6 is a time chart illustrating each signal generated by the communication device 1b according to the second embodiment. The clock signal S10, the diagnostic pulse signal S12, the transmission signal S14, the OR output signal S16, a receiver input signal S18, a first-tier output signal S20 of an exOR, and a pulse-verification-circuit input signal S22 are illustrated in FIG. 6. The horizontal axis represents a time. Each signal is, for example, formed of binary signals of a high-level signal and a low-level signal.

As illustrated in FIG. 6, the signal transmitter 100 generates a binary transmission signal S14 following the first rule. That is, the first rule according to the second embodiment represents a fact that the transmission signal S14 maintains a predetermined one of values of the binary at a high level or a low level in a predetermined first time period. For example, the transmission signal S14 according to the second embodiment maintains a high-level value in the first time period of two or more clock periods.

Meanwhile, the pulse generation circuit 102 periodically generates the diagnostic pulse signal S12 not following the first rule. For example, the diagnostic pulse signal S12 has a double period of the clock signal S10. That is, in a second time period shorter than a predetermined first time period, the diagnostic pulse signal S12 maintains to be a high level. In this manner, the pulse generation circuit 102 periodically generates the diagnostic pulse signal S12 different from the transmission signal S14.

As illustrated in FIG. 5, the OR circuit 204c outputs a result signal of a logical OR of output signals from the first circuit 204a and the second circuit 204b to the signal receiver 200 as the receiver input signal S18 (see FIG. 6). The output signal from the second circuit 204b is a signal two clock periods behind that of the OR output signal S16. Accordingly, the OR circuit 204c outputs a high-level signal to an OR output signal S16 with which a high-level signal is maintained during two clock periods and outputs a low-level signal to an OR output signal S16 with which a high-level signal cannot be maintained during two clock periods.

As is clear from the above descriptions, when the transmission signal S14 following the first rule is included in the OR output signal S16, the OR circuit 204c outputs a high-level signal. Meanwhile, when only the diagnostic pulse signal S12 not following the first rule is included in the OR output signal S16, the OR circuit 204c outputs a low-level signal. Similarly, also when the signal line L30 is disconnected and the OR output signal S16 is constantly at a low level, the diagnostic pulse signal S12 does not follow the first rule, so that the OR circuit 204c outputs a low-level signal. Further, also when the transmission signal S14 following the first rule and the diagnostic pulse signal S12 are superimposed on each other and a high-level signal is maintained during a time period of two or more clock periods, the transmission signal S14 follows the first rule, so that the OR circuit 204c outputs a high-level signal.

As described above, the receiver input signal S18 as an output signal from the OR circuit 204c is input to the signal receiver 200. Subsequently, the signal receiver 200 synchronizes a value equivalent to that of the receiver input signal S18 with the clock signal S10 and outputs the synchronized signal. That is, the signal receiver 200 outputs a high-level signal when the transmission signal S14 following the first rule is included in the OR output signal S16 and the signal receiver 200 outputs a low-level signal when only the diagnostic pulse signal S12 not following the first rule is included in the OR output signal S16.

The first exclusive OR circuit 204d outputs the first-tier output signal S20 of an exOR. A signal same as that input to the OR circuit 204c is input to the first exclusive OR circuit 204d. That is, when the transmission signal S14 following the first rule is included in the OR output signal S16, the first exclusive OR circuit 204d outputs a low-level signal. Further, when only the diagnostic pulse signal S12 is included in the OR output signal S16, the first exclusive OR circuit 204d outputs a high-level signal. Furthermore, also when a low-level signal is maintained during a time period of two or more clock periods, the first exclusive OR circuit 204d outputs a low-level signal. That is, even when the signal line L30 is disconnected and the OR output signal S16 is constantly at a low level, the first exclusive OR circuit 204d outputs a low-level signal.

As described above, the second exclusive OR circuit 204e outputs a result signal of an exclusive logical OR of output signals from the first exclusive OR circuit 204d and the second circuit 204b to the pulse verification circuit 202. That is, when the signal line L30 is disconnected and the OR output signal S16 is constantly at a low level, output signals from the first exclusive OR circuit 204d and the second circuit 204b are both at a low level, so that the second exclusive OR circuit 204e outputs a low-level signal to the pulse verification circuit 202.

Meanwhile, when the transmission signal S14 following the first rule is included in the OR output signal S16 or when only the diagnostic pulse signal S12 is included in the OR output signal S16, the second exclusive OR circuit 204e outputs a high-level signal to the pulse verification circuit 202.

As is clear from the above descriptions, when the transmission signal S14 following the first rule is included in the OR output signal S16, the signal receiver 200 outputs a high-level signal as the first signal. In this case, the diagnostic pulse signal S12 as a diagnostic signal does not follow the first rule, therefore even when the signal receiver 200 receives only the diagnostic pulse signal S12, it outputs a low-level signal. Meanwhile, even when the time periods of a high-level signal of the diagnostic pulse signal S12 and that of the transmission signal S14 following the first rule are overlapped on each other, the signal receiver 200 outputs a high-level signal.

As described above, even when the diagnostic pulse signal S12 as a diagnostic signal is periodically transmitted to the signal line L30, the signal receiver 200 can determine transmission of the transmission signal S14. Accordingly, even when a fault detection cycle is constantly repeated, the transmission signal S14 can be transmitted without delay.

Meanwhile, when the transmission signal S14 following the first rule is included in the OR output signal S16 or when only the diagnostic pulse signal S12 is included in the OR output signal S16, the pulse verification circuit 202 outputs a high-level signal. With this configuration, as far as there is no disconnection and the like in the signal line L30, the pulse verification circuit 202 constantly outputs a high-level signal as the second signal, so that devices or circuits on the receiver 20 side can determine that the signal line L30 is operating normally.

Further, also when a low-level signal is maintained during a time period of two or more clock periods, the pulse verification circuit 202 outputs a low-level signal. That is, even when the signal line L30 is disconnected and the OR output signal S16 is constantly at a low level, the pulse verification circuit 202 outputs a low-level signal. With this configuration, devices or circuits on the receiver 20 side can determine that an abnormality has occurred in the signal line L30.

Figure 7:
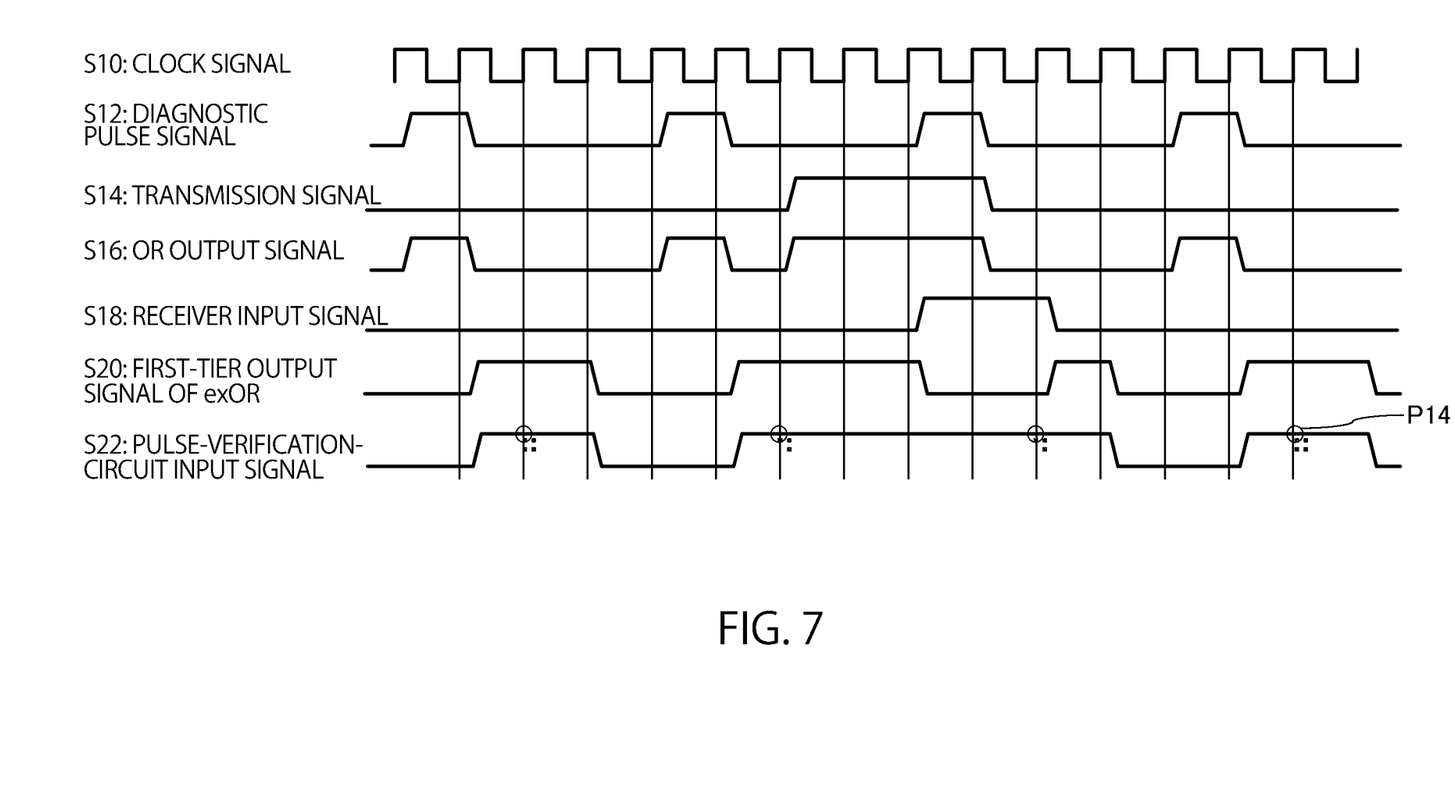
FIG. 7 is a time chart illustrating each signal when the period of a diagnostic pulse signal is four clock periods.

FIG. 7 is a time chart illustrating each signal when the period of the diagnostic pulse signal S12 is four clock periods. As illustrated in the receiver input signal S18 in FIG. 7, since the functions of the filter circuit 204 are the same, the OR circuit 204c outputs a high-level signal when the transmission signal S14 following the first rule is included in the OR output signal S16.

Meanwhile, as illustrated in the receiver input signal S18 in FIG. 7, even when only a diagnostic pulse signal S12 of four clock periods not following the first rule is included in the OR output signal S16, the OR circuit 204c outputs a low-level signal. Accordingly, similarly to FIG. 6, the signal receiver 200 outputs a high-level signal when the transmission signal S14 following the first rule is included in the OR output signal S16 and outputs a low-level signal when only the diagnostic pulse signal S12 not following the first rule is included in the OR output signal S16.

As described above, the first exclusive OR circuit 204d outputs the first-tier output signal S20 of an exOR. When the transmission signal S14 following the first rule is included in the OR output signal S16, the first exclusive OR circuit 204d outputs a low-level signal. Further, when only the diagnostic pulse signal S12 is included in the OR output signal S16, the first exclusive OR circuit 204d outputs a high-level signal. Furthermore, also when a low-level signal is maintained during two or more clock periods, the first exclusive OR circuit 204d outputs a low-level signal.

As described above, the second exclusive OR circuit 204e outputs a result signal of an exclusive logical OR of output signals from the first exclusive OR circuit 204d and the second circuit 204b to the pulse verification circuit 202. That is, when a low-level signal is maintained during two or more clock periods in the diagnostic pulse signal S12, output signals from the first exclusive OR circuit 204d and the second circuit 204b are both at a low level, so that the second exclusive OR circuit 204e outputs a low-level signal as the pulse-verification-circuit input signal S22 to the pulse verification circuit 202.

Meanwhile, when the transmission signal S14 following the first rule is included in the OR output signal S16 or when only the diagnostic pulse signal S12 is included in the OR output signal S16, the second exclusive OR circuit 204e outputs a high-level signal as the pulse-verification-circuit input signal S22 to the pulse verification circuit 202. Further, when only the diagnostic pulse signal S12 is included in the OR output signal S16, as indicated with a point P14 of the pulse-verification-circuit input signal S22, the second exclusive OR circuit 204e outputs a high-level signal as the high-level signal is synchronized with the period of the diagnostic pulse signal S12 and is delayed for two clock periods. With this configuration, as the pulse verification circuit 202 takes in the pulse-verification-circuit input signal S22 while it is synchronized with the period of the diagnostic pulse signal S12 and is delayed for two clock periods, the pulse verification circuit 202 can determine a fault in the signal line L30 while being synchronized with the period of the diagnostic pulse signal S12.

Accordingly, when a high-level signal is continuously output as it is synchronized with four clock periods of the diagnostic pulse signal S12 and is delayed for two clock periods, devices or circuits on the receiver 20 side can determine that there is no abnormality in the signal line L30. In this manner, even when the period of the diagnostic pulse signal S12 is made to be three or more times of corresponding clock periods, diagnosis on the signal line L30 can be performed.

As described above, according to the present embodiment, the first rule according to the transmission signal S14 is set such that a high-level value is maintained in the first time period that is predetermined two or more periods of the clock signal S10. Accordingly, even when only the diagnostic pulse signal S12 with which a high-level value does not continue longer than the first time period, the receiver 20 can be configured not to output a high-level signal (the first signal). Further, even when the time periods of a high-level signal of the diagnostic pulse signal S12 and that of the transmission signal S14 following the first rule are overlapped on each other, since these signals are following the first rule, the receiver 20 can output a high-level signal (the first signal). Therefore, even when the diagnostic pulse signal S12 as a diagnostic signal is periodically transmitted to the signal line L30, the signal receiver 200 can determine transmission of the transmission signal S14. With this configuration, even when a fault detection cycle is constantly repeated, the transmission signal S14 can be transmitted without delay.

Further, the transmitter 10 is configured to periodically transmit the diagnostic pulse signal S12 not following the first rule and having a high-level signal to the signal line L30, and when only the diagnostic pulse signal S12 is included in the OR output signal S16, the second exclusive OR circuit 204e of the filter circuit 204 is configured to output a high-level signal as the pulse-verification-circuit input signal S22 while it is synchronized with the period of the diagnostic pulse signal S12 and is delayed for two clock periods. Accordingly, the pulse verification circuit 202 of the receiver 20 takes in the pulse-verification-circuit input signal S22 as it is synchronized with the period of the diagnostic pulse signal S12 and is delayed for two clock periods, thereby being able to determine a fault in the signal line L30 while being synchronized with the period of the diagnostic pulse signal S12.

While certain embodiments of the present invention have been described, these embodiments have been presented by way of example only, and are not intended to limit the scope of the invention. The novel embodiments described herein may be embodied in a variety of other forms, and various omissions, substitutions, and changes may be made without departing from the spirit of the invention. These embodiments and modifications thereof would fall within the scope and spirit of the invention, and would fall within the invention described in the accompanying claims and their equivalents.

The invention claimed is:

1. A communication device configured to communicate binary signals via a signal line, comprising:
   a transmitter configured to transmit a transmission signal via the signal line, wherein the transmission signal includes at least a predetermined one of signal values in the binary and follows a first rule; and
   a receiver configured to output a first signal when the transmission signal following the first rule is included in a signal received by the receiver via the signal line and to output a second signal indicating that the signal line is valid when the receiver has received a signal having a same value as the predetermined signal value, wherein
   the first rule represents a fact that the predetermined signal value is maintained in a predetermined first time period, and
   the receiver is configured to output the first signal when the signal value is maintained in the first time period, and to output the second signal when the signal value is maintained in a second time period shorter than the first time period.

2. The device of claim 1, wherein
   the first rule represents a fact that a predetermined one of signal values in the binary is included at a predetermined first time point, and
   the receiver is configured to output the first signal when the signal value is included at the first time point.

3. The device of claim 2, wherein
   the transmitter and the receiver are both configured to receive a mutual clock signal, and
   the first time point is a timing of a rise or a fall of a clock signal.

4. The device of claim 3, wherein
   the transmitter is configured to periodically transmit a diagnostic signal not following the first rule and having the signal value, and
   the receiver is configured to output the second signal when the diagnostic signal is received.

5. The device of claim 4, wherein when either of a time point of a rise of a clock signal or a time point of a fall of the clock signal is set to be the first time point, the transmitter transmits a signal as the diagnostic signal having the signal value in a time period where the first time point that is one of the time point of the rise of the clock signal and the time point of the fall of the clock signal is not included and other one of the time point of the rise of the clock signal and the time point of the fall of the clock signal is included.

6. The device of claim 1, wherein
   the transmitter and the receiver are both configured to receive a mutual clock signal, and
   the first time period corresponds to two or more clock periods.

7. The device of claim 6, wherein
   the transmitter comprises:
   a signal transmitter configured to generate the transmission signal following the first rule and to transmit the transmission signal to the signal line; and
   a pulse generation circuit configured to generate a diagnostic signal not following the first rule and being a pulse of the binary and to transmit the diagnostic signal to the signal line.

8. The device of claim 7, wherein
   the receiver comprises:
   a signal receiver configured to output the first signal when a signal the signal receiver has received via the signal line includes the transmission signal following the first rule; and
   a pulse verification circuit configured to output the second signal when the pulse verification circuit has received the diagnostic signal.

9. The device of claim 7, wherein
   the receiver comprises:
   a signal receiver configured to output the first signal;
   a pulse verification circuit configured to output the second signal; and
   a filter circuit configured to cause the signal receiver to output the first signal when a signal the filter circuit has received via the signal line includes the transmission signal following the first rule and to cause the pulse verification circuit to output the second signal when a signal the filter circuit has received via the signal line includes the transmission signal following the first rule or the diagnostic signal.

10. The device of claim 9, wherein
    the filter circuit comprises:
    a first circuit configured to delay a signal the filter circuit has received via the signal line for one clock period;
    a second circuit configured to delay an output signal from the first circuit for one clock period;
    an OR circuit configured to output a result signal of a logical OR of output signals from the first circuit and the second circuit to the signal receiver;
    a first exclusive OR circuit configured to output a result signal of a logical exclusive OR of output signals from the first circuit and the second circuit; and
    a second exclusive OR circuit configured to output a result signal of a logical exclusive OR of output signals from the first exclusive OR circuit and the OR circuit to the pulse verification circuit.

11. A communication method of communicating binary signals via a signal line, comprising:
    transmitting a transmission signal via the signal line, the transmission signal having at least a predetermined one of signal values in the binary and following a first rule; and
    outputting a first signal when a signal received via the signal line includes the transmission signal following the first rule and outputting a second signal indicating that the signal line is valid when a signal having a same value as the predetermined signal value has been received, wherein
    the first rule represents a fact that the predetermined signal value is maintained in a predetermined first time period, and
    the first signal is output when the signal value is maintained in the first time period, and the second signal is output when the signal value is maintained in a second time period shorter than the first time period.

12. The method of claim 11, wherein
the first rule represents a fact that a predetermined one of signal values in the binary is included at a predetermined first time point, and
the first signal is output when the signal value is included at the first time point.

13. The method of claim 12, wherein
the transmitting and the outputting both include receiving a mutual clock signal, and
the first time point is a timing of a rise or a fall of a clock signal.

14. The method of claim 13, wherein
the transmitting includes periodically transmitting a diagnostic signal not following the first rule and having the signal value, and
the outputting includes outputting the second signal when the diagnostic signal is received.

15. The method of claim 14, wherein when either of a time point of a rise of a clock signal or a time point of a fall of the clock signal is set to be the first time point, the transmitting transmits a signal as the diagnostic signal having the signal value in a time period where the first time point that is one of the time point of the rise of the clock signal and the time point of the fall of the clock signal is not included and other one of the time point of the rise of the clock signal and the time point of the fall of the clock signal is included.

16. The method of claim 11, wherein
the transmitting and the outputting both rely on a mutual clock signal, and
the first time period corresponds to two or more clock periods.

17. The method of claim 16, further comprising:
generating a diagnostic signal that is a pulse of the binary and does not follow the first rule and transmitting the diagnostic signal to the signal line.

18. The method of claim 17, wherein
the second signal is output when the signal received via the signal line includes the diagnostic signal.

19. The method of claim 18, further comprising:
generating a first delayed signal by delaying the signal received via the signal line for one clock period;
generating a second delayed signal by delaying the first delayed signal for one clock period;
performing a logical OR operation on the first delayed signal and the second delayed signal to produce a first result signal that is used in generating the first signal;
performing a first logical exclusive OR operation on the first delayed signal and the second delayed signal; and
performing a second logical exclusive OR operation on an output of the first logical exclusive OR operation and an output of the logical OR operation to produce a second result signal that is used in generating the second signal.

* * * * *